US007124181B1

(12) United States Patent
Magdych et al.

(10) Patent No.: US 7,124,181 B1
(45) Date of Patent: Oct. 17, 2006

(54) SYSTEM, METHOD AND COMPUTER PROGRAM PRODUCT FOR IMPROVED EFFICIENCY IN NETWORK ASSESSMENT UTILIZING VARIABLE TIMEOUT VALUES

(75) Inventors: James S. Magdych, Chino, CA (US); Tarik Rahmanovic, Germantown, MD (US); John R. McDonald, Jacksonville, FL (US); Brock E. Tellier, Stamford, CT (US); Anthony C. Osborne, Sydney (AU); Nishad P. Herath, Sydney (AU)

(73) Assignee: McAfee, Inc., Santa Clara, CA (US)

( * ) Notice: Subject to any disclaimer, the term of this patent is extended or adjusted under 35 U.S.C. 154(b) by 813 days.

(21) Appl. No.: 09/895,536

(22) Filed: Jun. 29, 2001

(51) Int. Cl.
*G06F 15/16* (2006.01)

(52) U.S. Cl. .......................... 709/224; 726/25
(58) Field of Classification Search ........ 709/223–224; 713/201; 714/55; 726/25
See application file for complete search history.

(56) References Cited

U.S. PATENT DOCUMENTS

| 5,572,515 | A |   | 11/1996 | Williamson et al. | .......... 370/17 |
| 5,699,511 | A | * | 12/1997 | Porcaro et al. | ............... 714/55 |
| 5,734,641 | A | * | 3/1998 | Kawasaki et al. | .......... 370/242 |
| 5,978,939 | A | * | 11/1999 | Mizoguchi et al. | ........... 714/55 |
| 6,526,433 | B1 | * | 2/2003 | Chang et al. | ................ 709/201 |
| 6,574,737 | B1 | * | 6/2003 | Kingsford et al. | .......... 713/201 |
| 6,744,422 | B1 | * | 6/2004 | Schillings et al. | .......... 345/169 |
| 6,901,081 | B1 | * | 5/2005 | Ludwig | ....................... 370/519 |
| 7,000,247 | B1 |   | 2/2006 | Banzhof | ........................ 726/2 |

FOREIGN PATENT DOCUMENTS

| EP | 0 911 994 A2 | 4/1999 |
| EP | 0 911 994 A3 | 5/2001 |
| WO | 99/67609 | 12/1999 |
| WO | 00/25451 | 5/2000 |

OTHER PUBLICATIONS

"SuperComm '99: HP Launches Dedicated DWDM Test Solution", Atlanta, SuperComm '99, Jun. 8.
"OSA-155 DWDM System Analyzer", Wavetek Wandel Goltermann, http://fiberoptics.wwgsolutions.com/products/osa/osa155.html., 1999.
"DWDM System Analyzer", http://www.wwgsolutions.com.
"Launching the Q8384 Optical Spectrum Analyzer", http://www.www.advantest.co.jp/99-7-7-e.html, Jul. 7, 1999.
"DWDM and SONET/SDH functional test to 10 Gb/s", http://www.tm.agilent.com/tmo/TMNews/English/17-0002.html, Feb. 2000.
"Digital Lightwave Introduces Industry's First Integrated Portable DWDM Analyzer", http://www.lightwave.com/newspress/051700rls.htm, May 17, 2000.

(Continued)

*Primary Examiner*—Andrew Caldwell
*Assistant Examiner*—Benjamin A. Ailes
(74) *Attorney, Agent, or Firm*—Zilka-Kotab, PC; Christopher J. Hamaty

(57) ABSTRACT

A system, method and computer program product are provided for executing a risk-assessment scan with a variable timeout duration which is set based on network conditions. Initially, network conditions are measured in a network coupled between a source and a target. Subsequently, a risk-assessment scan is executed on the target from the source. A timeout is performed prior to making a determination that the target is failing to respond to the risk-assessment scan. Such timeout includes a variable duration which is set as a function of the measured network conditions.

25 Claims, 8 Drawing Sheets

OTHER PUBLICATIONS

"Characterize DWDM sytems in the field", http://www.tm.agilent.com/tmo/TMNews/English/02-9911.html, Nov. 1999.

"Understanding Dense WDM", Wavetek Wandel Goltermann, http://www.wwgsolutions.com.

* cited by examiner

SYSTEM, METHOD AND COMPUTER PROGRAM PRODUCT FOR IMPROVED EFFICIENCY IN NETWORK ASSESSMENT UTILIZING VARIABLE TIMEOUT VALUES

FIELD OF THE INVENTION

The present invention relates to risk-assessment scanning methods, and more particularly to risk-assessment scanning with improved efficiency.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

During the course of scanning, such security risk-assessment tools often open remote network connections to various target systems. Most of these connections rely on Transmission Control Protocol/Internet Protocol (TCP/IP) connectivity to establish communications, and test for security risks. There are many of such security vulnerabilities. As such, testing for the presence of the vulnerabilities can become quite time consuming, especially when auditing a network consisting of hundreds or thousands of systems.

Many aspects of scanning contribute to the latency of such process. One prominent aspect is the time that a target system takes to respond to network requests and the time that individual packets of data require to travel between a source system performing a risk-assessment scan and the target system of such a scan.

In the course of auditing for particular security threats, a scanner typically institutes a predefined timeout before determining that the target system is not responding. In order to optimize performance when scanning many systems or scanning a single system for many vulnerabilities, a scanner may lower this timeout value to prevent unnecessary waiting for unresponsive remote target systems. Due to varying network conditions, however, a timeout value that is set too low may result in abandoning scans against vulnerable systems that are only reachable over a high latency (i.e. slow data transfer speeds) network.

Prior Art FIG. 1A shows an exemplary system 100 which is subject to scanning latencies. As shown, such system 100 includes the Internet 102 which is in turn coupled to a wide area network (WAN) 104. The networks 102 and 104 are coupled via a router 106 for communication purposes.

Coupled to the networks 102 and 104 is a plurality of computers which include at least one scanning source 108 and a plurality of target computers 110. As shown in FIG. 1A, communication latencies may vary between the scanning source 108 and the target computers 110 due to variable network conditions existent in the networks 102 and 104. For example, a first and second target computer may require less than 10 ms to respond to the scanning source 108, while a third and fourth target computer may require more than 200 ms to respond to the scanning source 108.

Prior Art FIG. 1B shows exemplary statistics illustrating the manner in which timeouts contribute to scanning latencies. As shown, the actual response latency due to network conditions for a first and second target computer is less than 10 ms, while a third and fourth target computer requires more than 200 ms to respond. In each scan, the default timeout is set at 500 ms, a constant value in accordance with the prior art. Accordingly, there is a net time lost in each scan which varies based on network conditions. See FIG. 1B.

There is thus a need for a scanner capable of reducing the latency of the scanning process while avoiding abandoning vulnerable systems reachable over high latency networks.

DISCLOSURE OF THE INVENTION

A system, method and computer program product are provided for executing a risk-assessment scan with a variable timeout duration which is set based on network conditions. Initially, network conditions are measured in a network coupled between a source and a target. Subsequently, a risk-assessment scan is executed on the target from the source. A timeout is performed prior to making a determination that the target is failing to respond to the risk-assessment scan. Such timeout includes a variable duration which is set as a function of the measured network conditions.

In one embodiment, the network conditions may include a latency associated with communication between the source and the target.

In another embodiment, the network conditions are measured by transmitting a probe signal from the source to the target utilizing the network. Such probe signal prompts the target to send a response signal to the source utilizing the network. Thereafter, the response signal is received from the target utilizing the network. A response duration is then measured between the transmission of the probe signal and the receipt of the response signal. By this design, the timeout may be set as a function of the response duration.

As an option, the timeout of variable duration may be set by adding a default value with a variable value which is set as a function of the measured network conditions. Moreover, the timeout may be set by multiplying a default value with a variable factor which is set as a function of the measured network conditions.

In still another embodiment, the risk-assessment scan may include the execution of a plurality of risk-assessment scan modules. In such embodiment, the timeout may be performed for each of the risk-assessment scan modules.

Optionally, a result of the measurement of the network conditions may be stored. Further, the risk-assessment scan may be abandoned if the target fails to respond to the risk-assessment scan within the variable duration.

As yet another option, the network conditions may be measured for an entire network segment on which a plurality of targets are located. As such, the measured network conditions may be used to set the timeout for each of the targets located on the network segment.

BRIEF DESCRIPTION OF THE DRAWINGS

Prior Art

Prior Art

DESCRIPTION OF THE PREFERRED EMBODIMENTS

Figure 1A:
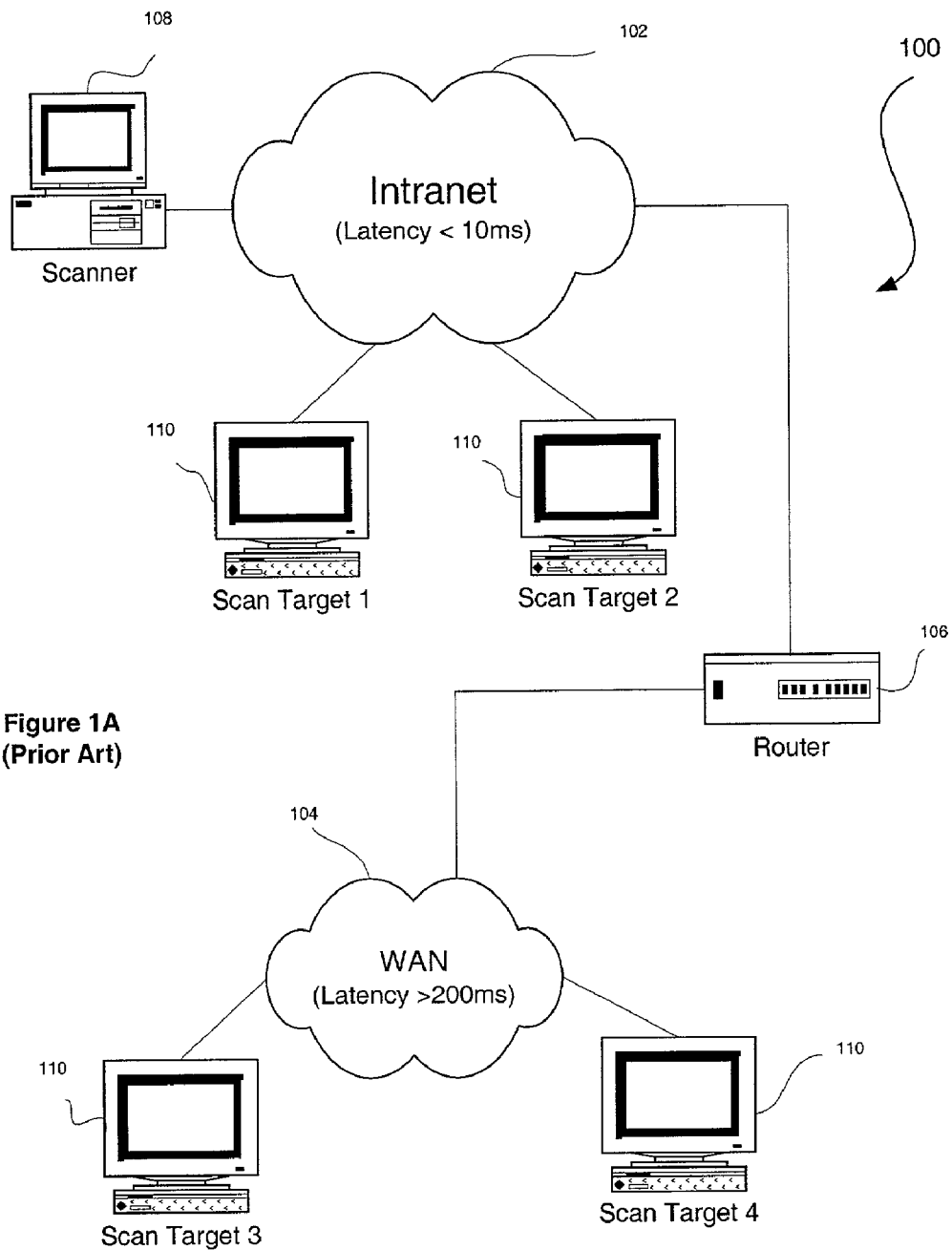
FIG. 1A shows an exemplary system which is subject to scanning latencies, in accordance with the prior art.
Figure 1B:
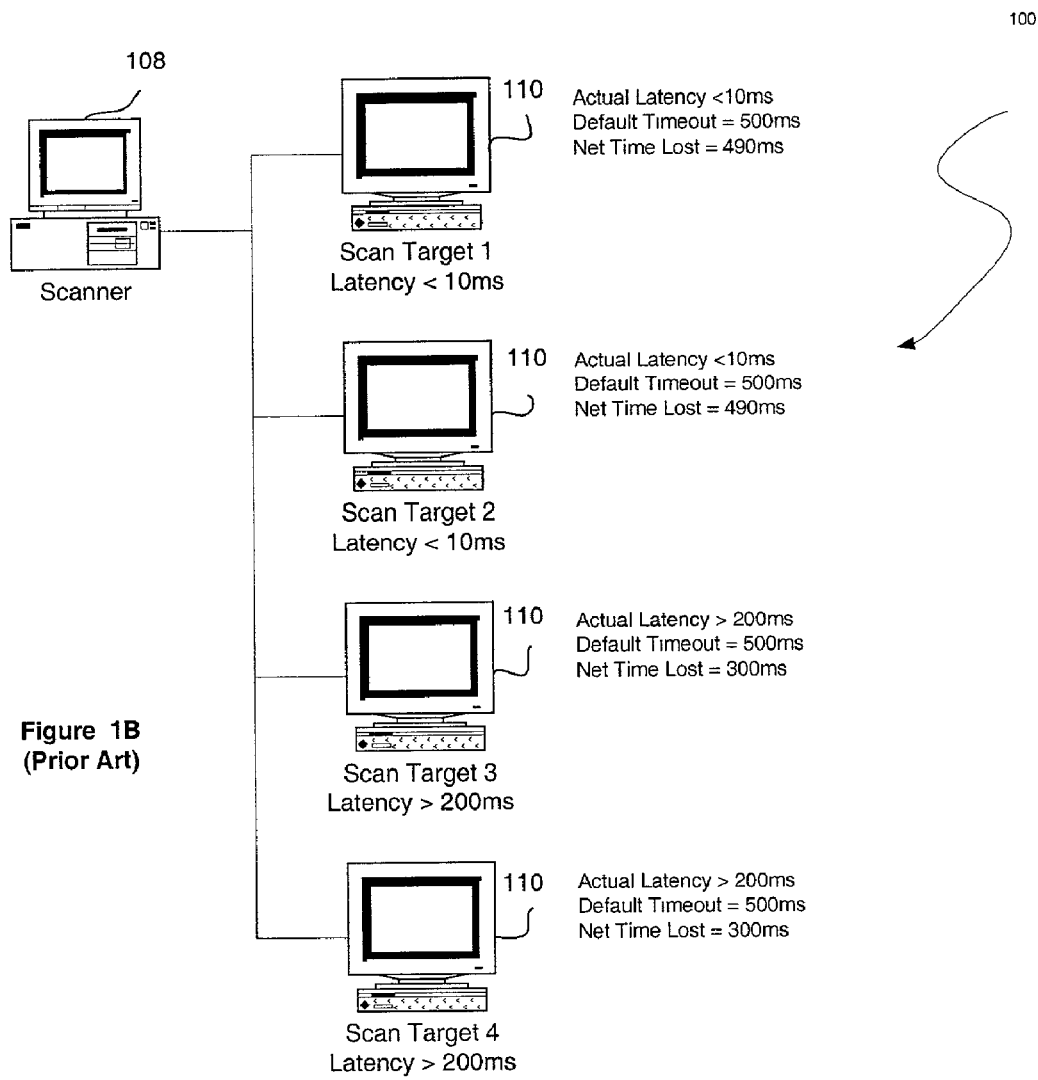
FIG. 1B shows exemplary statistics illustrating the manner in which timeouts contribute to scanning latencies, in accordance with the prior art.
Figure 2:
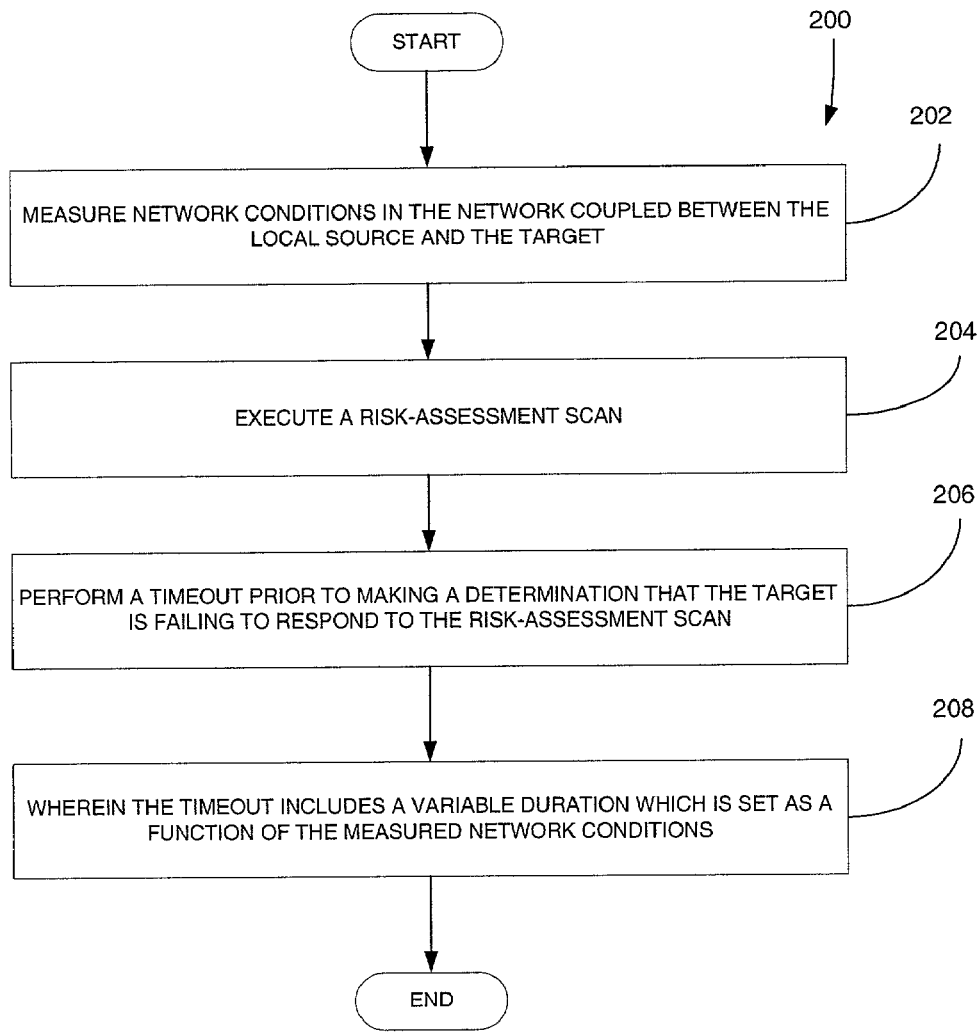
FIG. 2 illustrates a method for executing a risk-assessment scan with a variable timeout duration which is set based on network conditions.

FIG. 2 illustrates a method 200 for executing a risk-assessment scan with a variable timeout duration which is set based on network conditions. As is well known to those of ordinary skill in the art, network conditions may vary due to numerous factors including, but not limited to network congestion, network failure, etc.

Initially, in operation 202, such network conditions are measured in a network coupled between a source and a target. In the context of the present embodiment, the source may include any type of computer capable of carrying out a risk-assessment scan. Moreover, the target may include any type of hardware/software which may have detectable vulnerabilities to attacks.

Subsequently, in operation 204, a risk-assessment scan is executed on the target from the source. When the risk-assessment scan is initiated, a timeout is performed prior to making a determination that the target is failing to respond to the risk-assessment scan. Note operation 206. To this end, the risk-assessment scan may be abandoned if the target fails to respond to the risk-assessment scan within the variable duration.

It should be noted that such timeout includes a variable duration which is set as a function of the measured network conditions, as indicated in operation 208. By this design, the source is capable of reducing the latency of the scanning process by setting the variable timeout duration to a minimal value. This is accomplished while avoiding abandoning vulnerable systems reachable over high latency networks by increasing the variable timeout duration to accommodate such scenarios.

Figure 3:
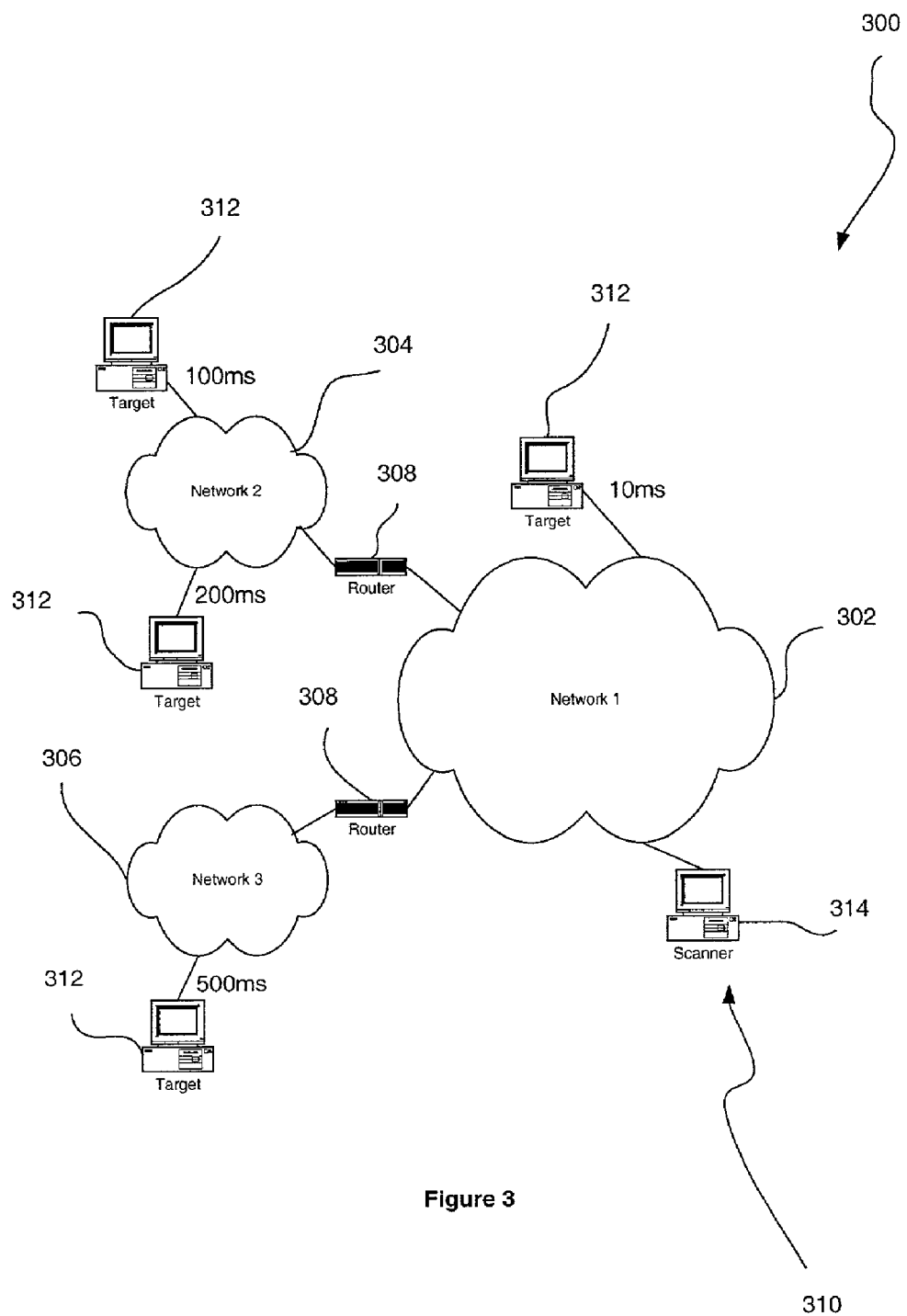
FIG. 3 illustrates an exemplary network environment in which the present embodiment may be implemented.

FIG. 3 illustrates an exemplary network environment 300 in which the present embodiment may be implemented. As shown, such components include a first network 302, a second network 304, and a third network 306. Of course, any number of networks may be included. Moreover, such networks may take any form including, but not limited to a local area network (LAN), a wide area network (WAN) such as the Internet, etc. The networks 302, 304 and 306 are coupled via routers 308 for communication purposes.

Coupled to the networks 302, 304 and 306 is a plurality of components 310 which may take the form of desktop computers, lap-top computers, hand-held computers, printers or any other type of computing hardware/software. In the context of the present embodiment, a plurality of targets 312 are provided which are coupled to at least one scanning source 314 via the networks 302, 304 and 306.

As shown in FIG. 3, communication latencies may vary between the scanning source 314 and the targets 312 due to variable network conditions. For example, it may require a first target 312 100 ms to respond to the scanning source 314, while a second target 312 requires 500 ms to respond to the scanning source 314.

Figure 4:
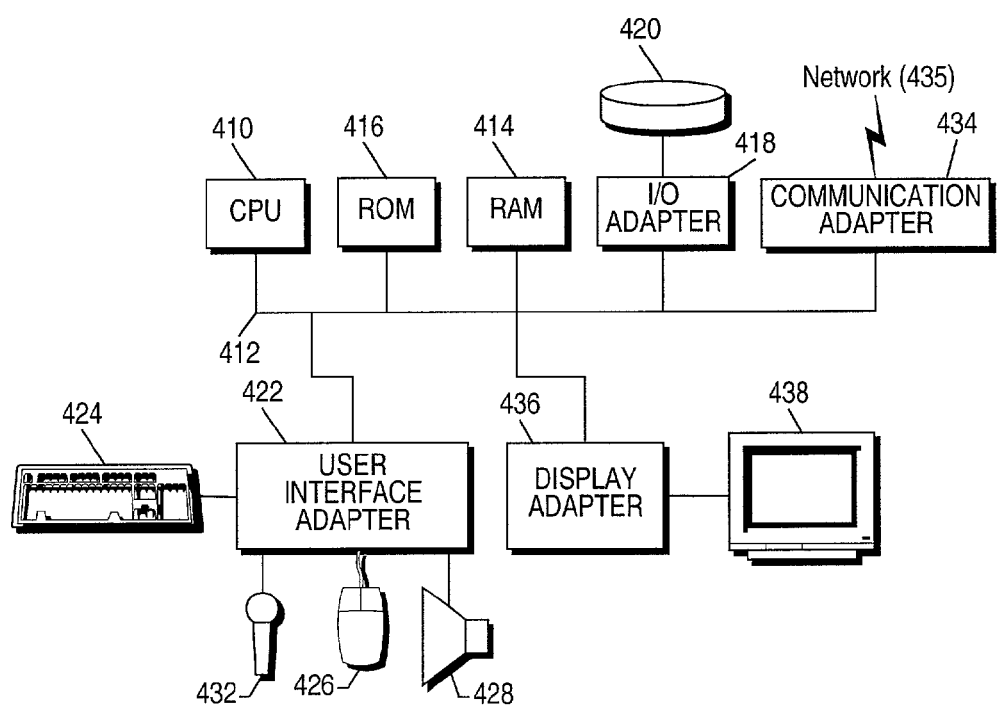
FIG. 4 shows a representative hardware environment associated with the components of FIG. 3, in accordance with one embodiment.

FIG. 4 shows a representative hardware environment associated with the components 310 of FIG. 3, in accordance with one embodiment. Such figure illustrates a typical hardware configuration of a workstation in accordance with a preferred embodiment having a central processing unit 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 5A:
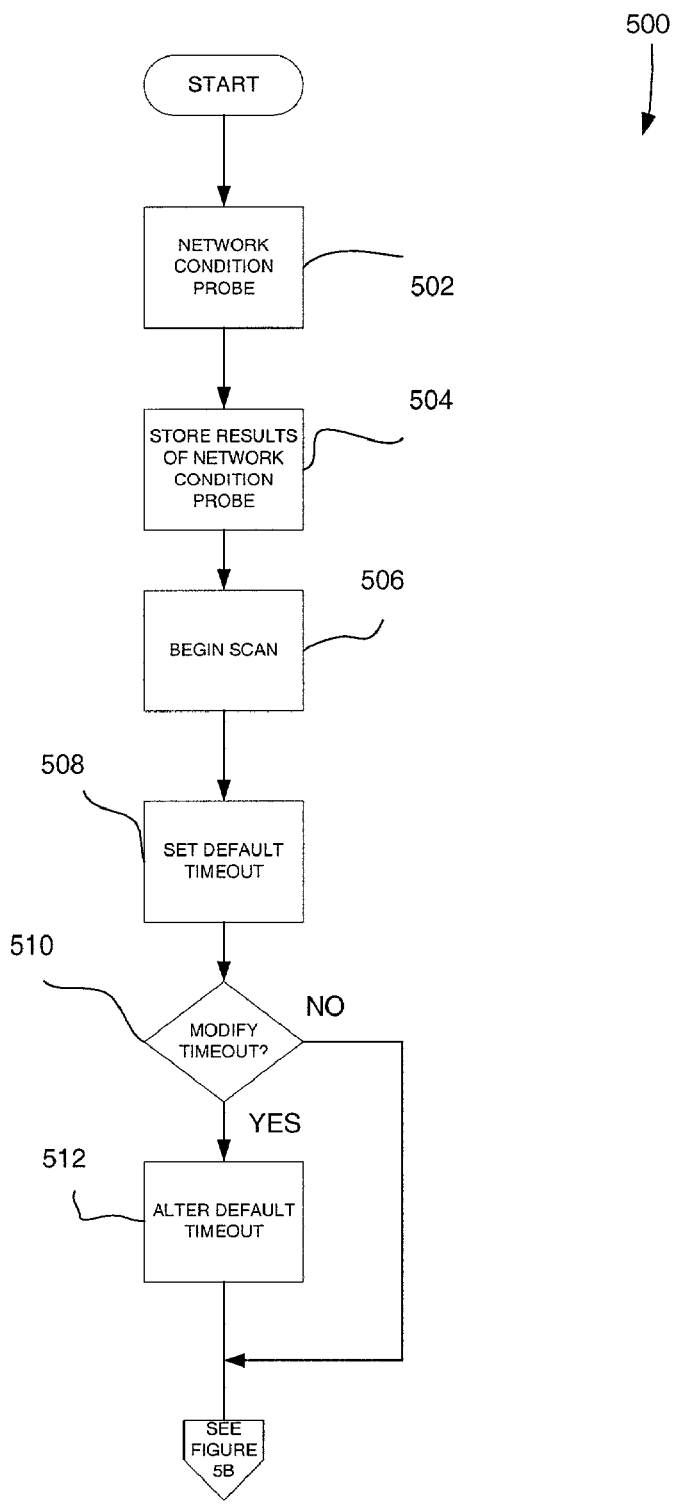
FIGS. 5A and 5B illustrate a more comprehensive method for executing a risk-assessment scan with a variable timeout duration, in accordance with another embodiment.
Figure 5B:
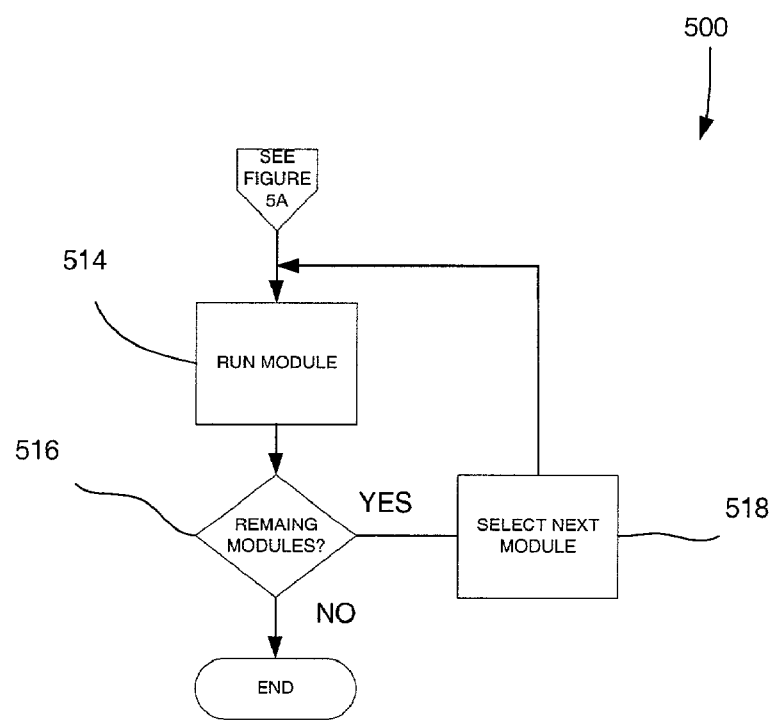

FIGS. 5A and 5B illustrate a more comprehensive method 500 for executing a risk-assessment scan with a variable timeout duration, in accordance with another embodiment. First, a network condition probe is initiated in operation 502. The purpose of such network condition probe is to identify any latency, i.e. response duration $R_{actual}$, attributable solely to network conditions. As mentioned earlier, network conditions may vary due to numerous factors including, but not limited to network congestion, network failure, etc. More information regarding the network probe will be set forth in greater detail during reference to FIG. 6.

Next, in operation 504, results of the network condition probe are stored for use later in the present method 500. The risk-assessment scan is then initiated in operation 506. In one embodiment, the risk-assessment scan may include the execution of a plurality of risk-assessment scan modules. In the context of the present description, such risk-assessment scan modules refer to different functions that work in conjunction to identify various vulnerabilities during the risk-assessment scan. Moreover, these vulnerabilities may include any aspect of the target 314 that make it susceptible to an attack or intrusion by an attacker.

With continuing reference to FIG. 5A, the timeout is set by assigning a default timeout value $T_{default}$ in operation 508. It should be noted that such default timeout value $T_{default}$ corresponds to a typical default response duration $R_{default}$. Ideally, the default timeout value $T_{default}$ is set such that the latency incurred by the timeout during the scanning process is minimized in view of the default response duration $R_{default}$. This may be accomplished by setting the default timeout value $T_{default}$ as the sum of the default response duration $R_{default}$ and a time the target 312 is given to respond.

Thereafter, it is determined in decision 510 whether the default timeout value $T_{default}$ should be modified in view of a variance in the network conditions. This is accomplished by reviewing the actual response duration $R_{actual}$ stored by the network condition probe in operation 504. If the actual response duration $R_{actual}$ deviates from the default response duration $R_{default}$ by a predetermined amount (i.e. 10%, 20%, $R_{default}$ *F), the default timeout value $T_{default}$ is modified in operation 512. In one embodiment, a variable value ($R_{actual}$ *N) which is set as a function of the measured actual response duration $R_{actual}$ (i.e. network conditions) may be added to the default timeout value $T_{default}$. Table 1 summarizes the foregoing exemplary algorithm that may be carried out during decision 510 and operation 512.

TABLE 1

If $R_{actual}$ is < or > $R_{default}$ by ($R_{default}$ * F),
then $T_{actual} = T_{default} + R_{actual} * N$;
else $T_{actual} = T_{default}$; and
where:
$R_{default}$ = default response duration,
$R_{actual}$ = actual response duration,
$T_{default}$ = default timeout value,
$T_{actual}$ = actual timeout value,
F = deviation factor, and
N = normalizing factor.

In various other embodiments, the timeout may be set by multiplying the default timeout value $T_{default}$ with a variable factor which is set as a function of the measured network conditions. It should be noted that the algorithm need not necessarily start with and alter a default timeout value $T_{default}$ and, instead, calculate the actual timeout value $T_{default}$ from scratch.

In still another embodiment, a plurality of network condition probes (See operation 502 of FIG. 5 and FIG. 6) may be conducted to gather multiple network condition measurements on a single target 312. In such embodiment, a minimum, average, deviance from the average, or maximum of the network condition measurements may be used in tailoring the timeout to the particular network conditions. It should be noted that any other algorithm may be used to tailor the variable duration to accommodate the measured network conditions.

Once the timeout is set, the current risk-assessment module may be run in operation 514. Note FIG. 5B. If during such scan, the target 312 fails to respond within the duration determined in decision 510 and operation 512, the risk-assessment module may be abandoned. As such, operation 514 results in either scan results or a system failure within the variable timeout duration.

After the current risk-assessment module is run, it is determined in decision 516 as to whether any further risk-assessment modules remain. If so, a next risk-assessment module is selected in operation 518, and operations 514–516 are repeated. If no further risk-assessment modules remain in decision 516, the method 500 is terminated.

It should be noted that the foregoing method may be performed on any number of target components 312. In an embodiment where more than one target component 312 is scanned, the timeout values may be set for each target component 312. In the alternative, the target components 312 may be grouped as a function of the network conditions, and the timeout values may be set for each group. In any case, the target components 312 may each be probed in operation 502, the results may be stored in operation 504, and the timeout may be set in operation 508. Of course, any desired method of addressing a plurality of target component 312 may be employed.

In still another embodiment, the network conditions may be measured for an entire network segment on which a plurality of target components 312 is located. As such, the measured network conditions may be used to set the timeout for each of the target components 312 located on the network segment. The present embodiment thus avoids the need to perform a probe and determine a timeout value for every single target component 312 on a network segment.

Figure 6:
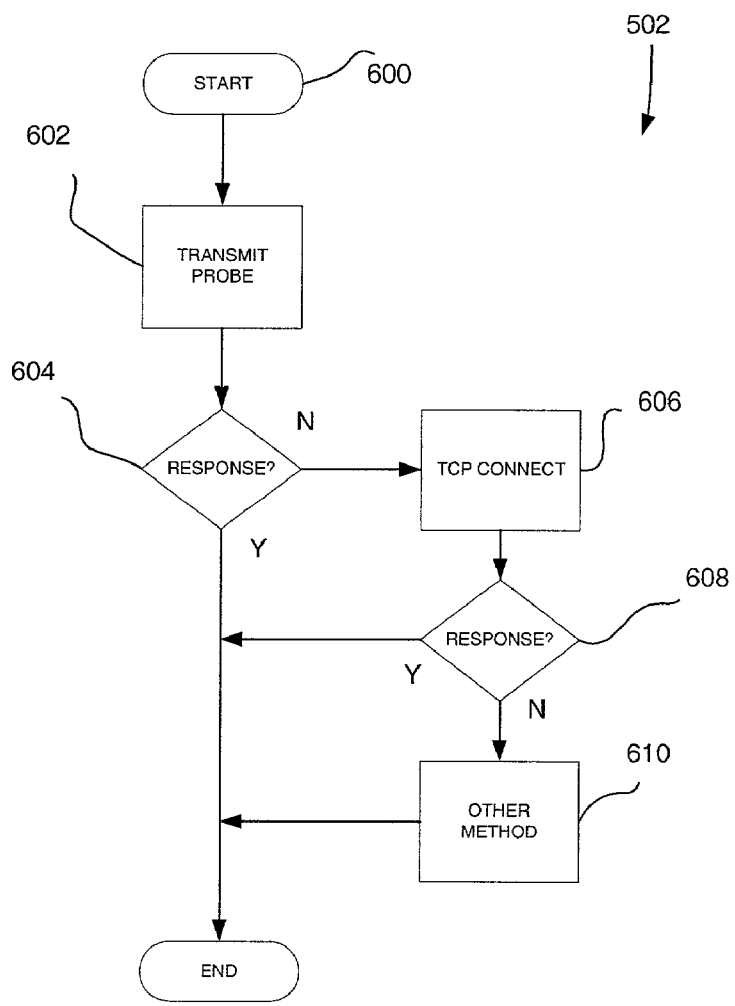
FIG. 6 illustrates a method of conducting a network condition probe.

FIG. 6 illustrates a method 600 of conducting a network condition probe in accordance with operation 502 of FIG. 5. Initially, in operation 602, a probe signal is transmitted from the source to the target utilizing the network. Such probe signal prompts the target to send a response signal to the source utilizing the network.

Thereafter, it is determined whether the response signal is received from the target. Note decision 604. If a response is received, the process is ended and a response duration may be measured and stored in subsequent operations. If no response is received, however, various other methods may be employed to measure network conditions.

For example, a TCP connect may be initiated in operation 606. Again, if a response is received, the process is ended. Note decision 608. It should be understood that any other method of measuring network conditions may be initiated solely or in combination with the foregoing techniques. See operation 610. For example, an echo request (i.e. "ping") may be utilized as well as a message utilizing the Internet Control Message Protocol (ICMP), or any other signal that elicits a response. In a particular embodiment, an ICMP Type 8, code 0 "echo request" packet may be utilized. In still another embodiment, a TCP "syn" packet may be sent, and a time period may be measured between when the packet is sent and an appropriate response (i.e. TCP "rst" or TCP "syn-ack" packet) is received.

The present embodiments thus provide a mechanism to vary the length of a timeout depending on network conditions. By this design, the scanning source is capable of reducing the latency of the scanning process by setting the variable timeout duration to a minimal value. This is accomplished while avoiding abandoning vulnerable systems reachable over high latency networks.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of executing a risk-assessment scan with a variable timeout duration which is set based on network conditions, comprising:

measuring network conditions in a network coupled between a source and a target;

executing a risk-assessment scan on the target from the source; and performing a risk-assessment scan-related timeout prior to making a determination that the target is failing to respond to the risk-assessment scan;

wherein the timeout includes a variable duration which is set as a function of the measured network conditions;

wherein the risk-assessment scan is abandoned if the target fails to respond to the risk-assessment scan within the variable duration;

wherein the timeout is set by adding a default value with a variable value which is set as a function of the measured network conditions;

wherein the timeout is set utilizing a plurality of network condition probes that gather multiple network condition measurements on a single target;

wherein the measured network conditions are measured for an entire network segment on which a plurality of target components is located.

2. The method as recited in claim 1, wherein the network conditions include latency associated with communication between the source and the target.

3. The method as recited in claim 1, wherein measuring the network conditions includes transmitting a probe signal from the source to the target utilizing the network.

4. The method as recited in claim 3, wherein the probe signal prompts the target to send a response signal to the source utilizing the network.

5. The method as recited in claim 4, wherein measuring the network conditions further includes receiving the response signal from the target utilizing the network.

6. The method as recited in claim 5, wherein measuring the network conditions further includes measuring a response duration between the transmission of the probe signal and the receipt of the response signal.

7. The method as recited in claim 6, wherein the timeout is set as a function of the response duration.

8. The method as recited in claim 1, wherein executing the risk-assessment scan includes executing a plurality of risk-assessment scan modules.

9. The method as recited in claim 8, wherein the timeout is performed for each of the risk-assessment scan modules.

10. The method as recited in claim 1, and further comprising storing a result of the measurement of the network conditions.

11. The method as recited in claim 1, wherein the source is capable of reducing a latency of the risk-assessment scan by setting the variable duration to a minimal value, while avoiding the abandonment of vulnerable systems reachable over high latency networks by increasing the variable duration to accommodate such scenarios.

12. A computer program product embodied on a computer readable medium for executing a risk-assessment scan with a variable timeout duration which is set based on network conditions, comprising:

a) computer code for measuring network conditions in a network coupled between a source and a target;

b) computer code for executing a risk-assessment scan on the target from the source; and c) computer code for performing a risk-assessment scan-related timeout prior to making a determination that the target is failing to respond to the risk-assessment scan;

d) wherein the timeout includes a variable duration which is set as a function of the measured network conditions;

e) wherein the risk-assessment scan is abandoned if the target fails to respond to the risk-assessment scan within the variable duration;

wherein the timeout is set by adding a default value with a variable value which is set as a function of the measured network conditions;

f) wherein the timeout is set utilizing a plurality of network condition probes that gather multiple network condition measurements on a single target;

g) wherein the measured network conditions are measured for an entire network segment on which a plurality of target components is located.

13. The computer program product as recited in claim 12, wherein the network conditions include latency associated with communication between the source and the target.

14. The computer program product as recited in claim 12, wherein measuring the network conditions includes transmitting a probe signal from the source to the target utilizing the network.

15. The computer program product as recited in claim 14, wherein the probe signal prompts the target to send a response signal to the source utilizing the network.

16. The computer program product as recited in claim 15, wherein measuring the network conditions further includes receiving the response signal from the target utilizing the network.

17. The computer program product as recited in claim 16, wherein measuring the network conditions further includes measuring a response duration between the transmission of the probe signal and the receipt of the response signal.

18. The computer program product as recited in claim 17, wherein the timeout is set as a function of the response duration.

19. The computer program product as recited in claim 12, wherein executing the risk-assessment scan includes executing a plurality of risk-assessment scan modules.

20. The computer program product as recited in claim 19, wherein the timeout is performed for each of the risk-assessment scan modules,.

21. The computer program product as recited in claim 12, and further comprising computer code for storing a result of the measurement of the network conditions.

22. The computer program product as recited in claim 12, wherein the network conditions are measured for a network segment, and the measured network conditions are used to set the timeout for a plurality of targets located on the network segment.

23. A system embodied on a computer readable medium for executing a risk-assessment scan with a variable timeout duration which is set based on network conditions, comprising:

a) logic for measuring network conditions in a network coupled between a source and a target;

b) logic for executing a risk-assessment scan on the target from the source; and c) logic for performing a risk-assessment scan-related timeout prior to making a determination that the target is failing to respond to the risk-assessment scan;

d) wherein the timeout includes a variable duration which is set as a function of the measured network conditions;

e) wherein the risk-assessment scan is abandoned if the target fails to respond to the risk-assessment scan within the variable duration;

wherein the timeout is set by adding a default value with a variable value which is set as a function of the measured network conditions;

f) wherein the timeout is set utilizing a plurality of network condition probes that gather multiple network condition measurements on a single target;

g) wherein the measured network conditions are measured for an entire network segment on which a plurality of target components is located.

24. A method of executing a risk-assessment scan with a variable timeout duration which is set based on network conditions, comprising:

a) transmitting a probe signal from a source to a target utilizing a network, the probe signal prompting the target to send a response signal to the source utilizing the network b) receiving the response signal from the target utilizing the network;

c) measuring a response duration between the transmission of the probe signal and the receipt of the response signal;

d) executing a risk-assessment scan including a plurality of risk-assessment scan modules;

e) performing a risk-assessment scan-related timeout prior to making a determination that the target is failing to respond to each of the risk-assessment scan modules, wherein the timeout includes a variable duration which is set as a function of the response duration; and f) abandoning the risk-assessment scan modules if the target fails to respond to the risk-assessment scan modules within the variable duration
wherein the timeout is set by adding a default value with a variable value which is set as a function of the measured network conditions;

g) wherein the timeout is set utilizing a plurality of network condition probes that gather multiple network condition measurements on a single target;

h) wherein the measured network conditions are measured for an entire network segment on which a plurality of target components is located.

25. A computer program product embodied on a computer readable medium for executing a risk-assessment scan with a variable timeout duration which is set based on network conditions, comprising:

a) computer code for transmitting a probe signal from a source to a target utilizing a network, the probe signal prompting the target to send a response signal to the source utilizing the network;

b) computer code for receiving the response signal from the target utilizing the network;

c) computer code for measuring a response duration between the transmission of the probe signal and the receipt of the response signal;

d) computer code for executing a risk-assessment scan including a plurality of risk-assessment scan modules;

e) computer code for performing a risk-assessment scan-related timeout prior to making a determination that the target is failing to respond to each of the risk-assessment scan modules, wherein the timeout includes a variable duration which is set as a function of the response duration; and f) computer code for abandoning the risk-assessment scan modules if the target fails to respond to the risk-assessment scan modules within the variable duration;
wherein the timeout is set by adding a default value with a variable value which is set as a function of the measured network conditions;

g) wherein the timeout is set utilizing a plurality of network condition probes that gather multiple network condition measurements on a single target;

h) wherein the measured network conditions are measured for an entire network segment on which a plurality of target components is located.

* * * * *